United States Patent
Lovvorn

(10) Patent No.: US 7,107,823 B1
(45) Date of Patent: Sep. 19, 2006

(54) PACKAGE SEAL INSPECTING APPARATUS, AND METHOD FOR INSPECTING PACKAGE SEALS

(75) Inventor: Kent Lovvorn, Richmond, VA (US)

(73) Assignee: CPOR Solutions, Inc., Richmond, VA (US)

( * ) Notice: Subject to any disclaimer, the term of this patent is extended or adjusted under 35 U.S.C. 154(b) by 84 days.

(21) Appl. No.: 10/989,742

(22) Filed: Nov. 17, 2004

Related U.S. Application Data

(60) Provisional application No. 60/520,297, filed on Nov. 17, 2003.

(51) Int. Cl.
*G01M 3/34* (2006.01)
*G01M 3/36* (2006.01)

(52) U.S. Cl. .................. 73/49.3; 73/52; 73/41; 73/49.2

(58) Field of Classification Search ............. 73/49.3, 73/49.2, 40, 45.4, 45.1, 45, 52
See application file for complete search history.

(56) References Cited

U.S. PATENT DOCUMENTS

| | | | |
|---|---|---|---|
| 4,148,213 A | 4/1979 | Prakken | |
| 4,330,064 A | 5/1982 | Weinert | |
| 4,649,740 A | 3/1987 | Franklin | |
| 4,671,101 A * | 6/1987 | Franklin | 73/49.3 |
| 4,697,452 A * | 10/1987 | Prakken | 73/49.3 |
| 4,862,732 A | 9/1989 | Raymond et al. | |
| 4,955,226 A * | 9/1990 | Beaty et al. | 73/49.3 |
| 5,531,101 A | 7/1996 | Fenlon | |
| 5,533,385 A * | 7/1996 | Frievalt | 73/49.3 |
| 5,767,392 A | 6/1998 | Belcher et al. | |
| 5,786,530 A * | 7/1998 | Fenlon | 73/49.3 |
| 6,105,419 A | 8/2000 | Michels et al. | |
| 6,474,141 B1 * | 11/2002 | Takaoka et al. | 73/49.3 |
| 6,568,247 B1 | 5/2003 | Taylor | |
| 6,941,796 B1 * | 9/2005 | Bennett | 73/49.3 |
| 2004/0035189 A1* | 2/2004 | Tsoukalas et al. | 73/41 |

* cited by examiner

*Primary Examiner*—Hezron Williams
*Assistant Examiner*—Ryan Christensen
(74) *Attorney, Agent, or Firm*—Berenato, White & Stavish LLC

(57) ABSTRACT

A package inspection apparatus is provided, and includes a conveyor for transporting a package, a pressure unit for applying a compressive force to the package, a tracer movable over the upper surface of the package for measuring package attributes along a dimension of the package, and a processor. According to some embodiments, the processor determines a trace area of the package from the package measurement attributes. According to certain embodiments, the measured package attributes are compared to a running average, and if the package is within predetermined tolerances, the package measurement attributes are averaged into the running average. Also provided is a related method.

22 Claims, 7 Drawing Sheets

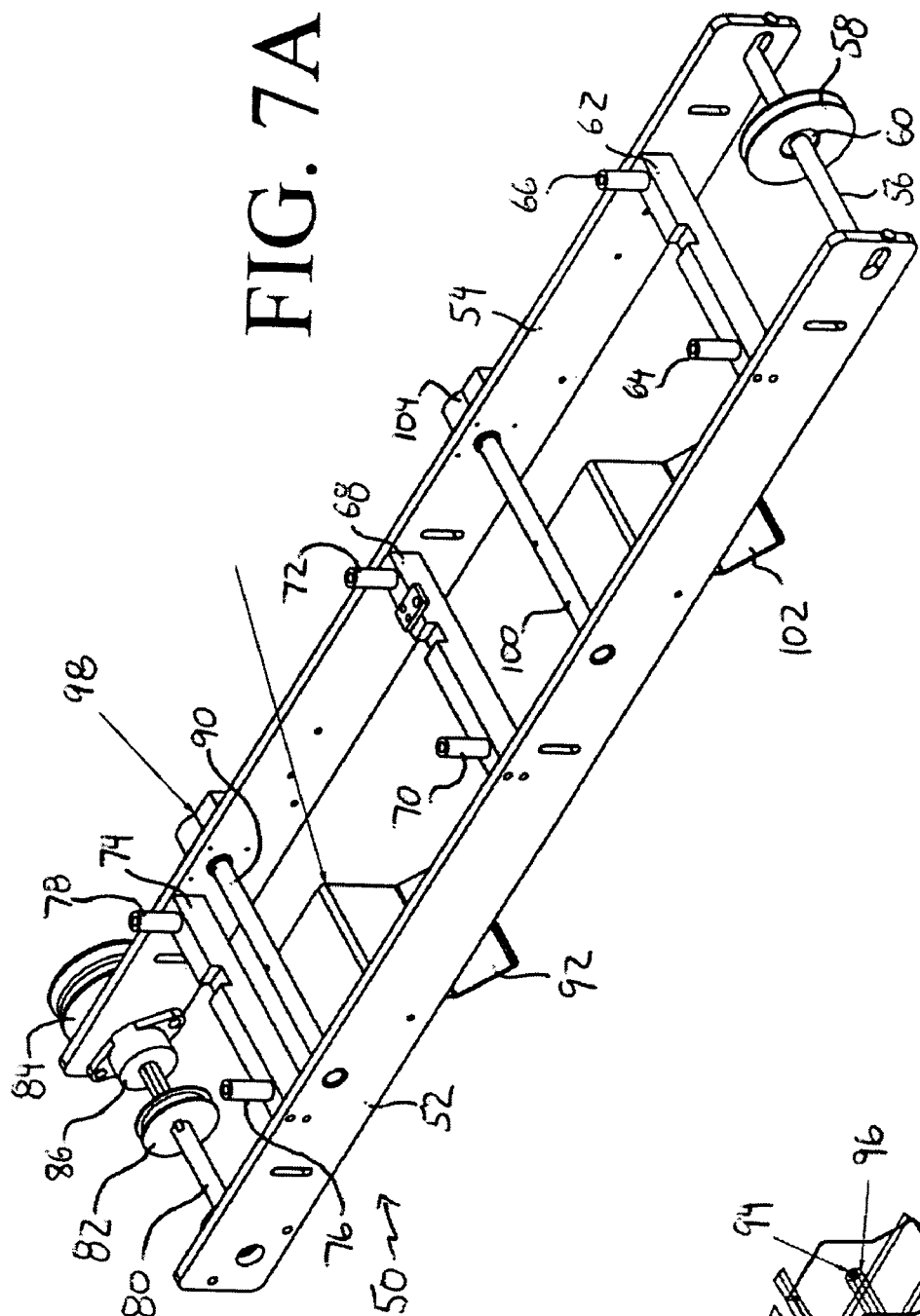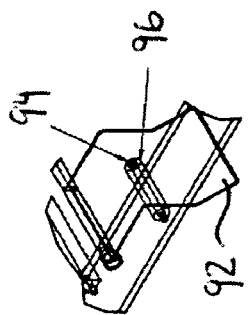

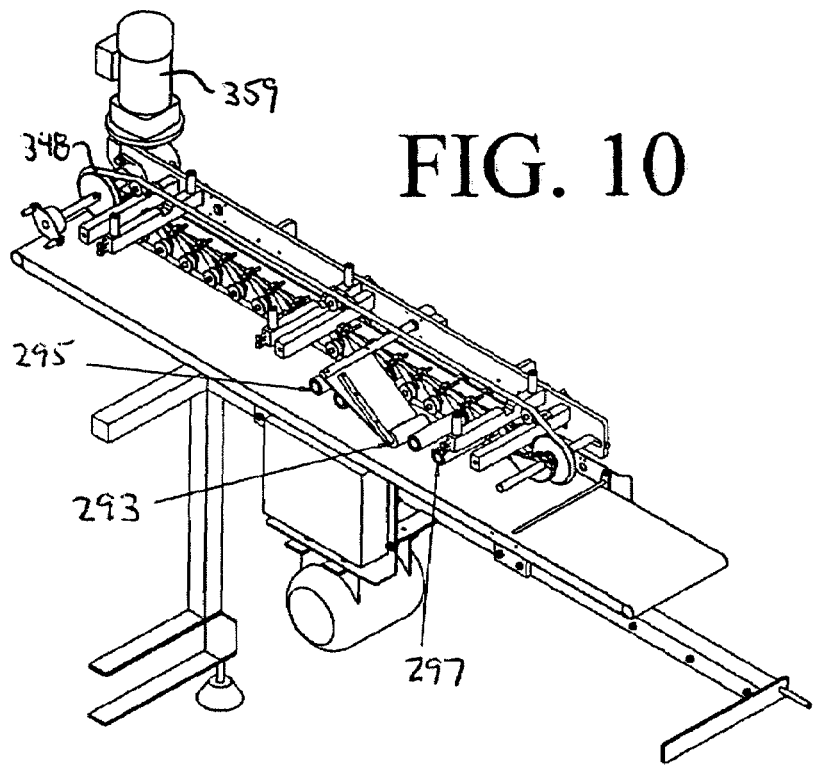
FIG. 10
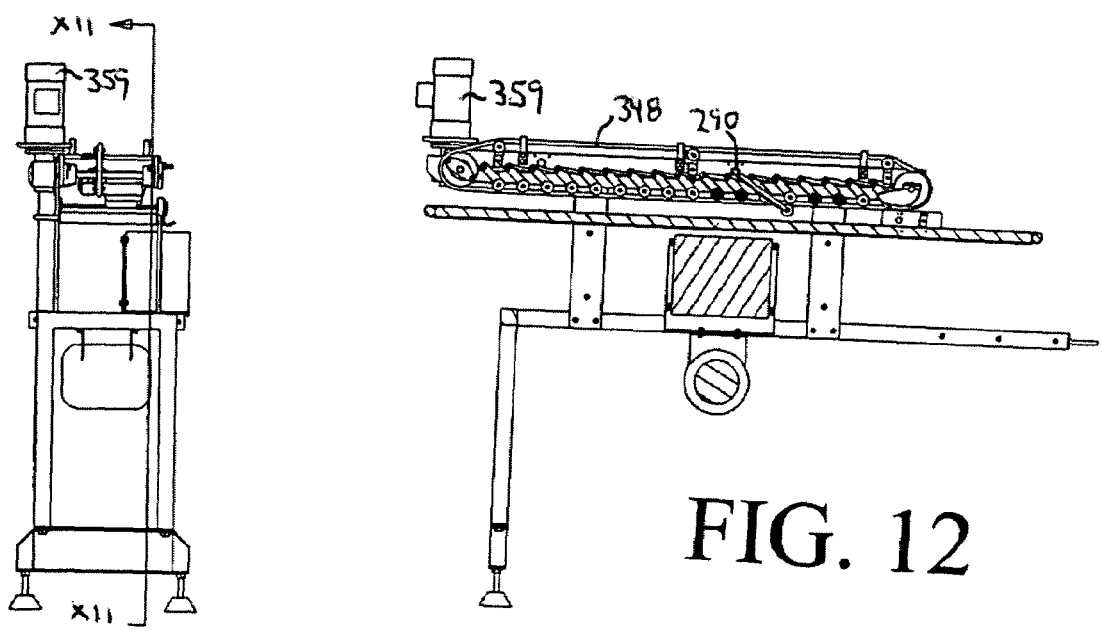
FIG. 11
FIG. 12

PACKAGE SEAL INSPECTING APPARATUS, AND METHOD FOR INSPECTING PACKAGE SEALS

RELATED APPLICATION

This application claims the benefit of priority of provisional application 60/520,297 filed Nov. 17, 2003, the complete disclosure of which is incorporated herein by reference.

COMPUTER PROGRAM LISTING

A computer program listing appendices are submitted herewith on compact disc recordable (CD-R) as Appendices A and B. Duplicate copies of Appendix A are provided as Disc 1/Copy 1 and Disc 1/Copy 2. The materials on the CD-R are identical to each other. Duplicate copies of Appendix B are provided Disc 2/Copy 1 and Disc 2/Copy 2.

The files on the compact discs are incorporated herein by reference, and are listed below:

| DISC 1 (FOR APPENDIX A) | | |
| --- | --- | --- |
| File Name | Size in bytes | Date |
| GXRF.DAT | 3.12 KB | Nov. 13, 2003 |
| GXRF.IDX | 1.21 KB | Nov. 13, 2003 |
| GCMT.IDX | 11.9 KB | Nov. 14, 2003 |
| GXRF.DAT | 3.12 KB | Nov. 13, 2003 |
| GXRF.IDX | 1.21 KB | Nov. 13, 2003 |
| DWG.BLD | 3.76 KB | Aug. 4, 1997 |
| A.CMT | 40 Bytes | Nov. 13, 2003 |
| A00.CMT | 78 Bytes | Nov. 13, 2003 |
| H.CMT | 56 Bytes | Nov. 13, 2003 |
| H00.CMT | 79 Bytes | Nov. 13, 2003 |
| H59.CMT | 1.37 KB | Nov. 14, 2003 |
| H5901.CMT | 59 Bytes | Nov. 14, 2003 |
| I.CMT | 49 Bytes | Nov. 13, 2003 |
| I00.CMT | 87 Bytes | Nov. 13, 2003 |
| L.CMT | 40 Bytes | Nov. 13, 2003 |
| L00.CMT | 78 Bytes | Nov. 13, 2003 |
| COUNTER.CMT | 494 Bytes | Nov. 13, 2003 |
| DTRC-RD.CMT | 582 Bytes | Nov. 13, 2003 |
| FINFOUT.COM | 399 Bytes | Nov. 13, 2003 |
| FTRC-RD.CMT | 485 Bytes | Nov. 13, 2003 |
| ICNS-RD.CMT | 664 Bytes | Nov. 13, 2003 |
| ICNS-WR.CMT | 672 Bytes | Nov. 13, 2003 |
| ISET-213.CMT | 460 Bytes | Nov. 13, 2003 |
| ITRC-RD.CMT | 632 Bytes | Nov. 13, 2003 |
| MSG-RCV.CMT | 1.05 KB | Nov. 13, 2003 |
| MSG-SND.CMT | 1.06 KB | Nov. 13, 2003 |
| TRACE.CMT | 283 Bytes | Nov. 13, 2003 |
| IW$$$00.CMT | 73 Bytes | Nov. 13, 2003 |
| MB$$$00.CMT | 2.22 KB | Nov. 14, 2003 |
| MW$$$00.CMT | 2.79 KB | Nov. 14, 2003 |
| OB$$$00.CMT | 121 Bytes | Nov. 14, 2003 |
| OW$$$00.CMT | 85 Bytes | Nov. 13, 2003 |
| $REGSET | 4.47 KB | Nov. 14, 2003 |
| $REGSET.ORG | 4.34 KB | Nov. 13, 2003 |
| S.CMT | 28.6 KB | Nov. 13, 2003 |
| $gh91.tmp | 1.30 KB | Nov. 13, 2003 |
| $gh92.tmp | 1.49 KB | Nov. 13, 2003 |
| $gh93.tmp | 1.67 KB | Nov. 13, 2003 |
| $gh94.tmp | 1.86 KB | Nov. 13, 2003 |
| $gh95.tmp | 2.05 KB | Nov. 13, 2003 |
| $gh96.tmp | 2.24 KB | Nov. 13, 2003 |
| $gh97.tmp | 2.42 KB | Nov. 13, 2003 |
| $gh98.tmp | 2.61 KB | Nov. 13, 2003 |
| $gh99.tmp | 198 Bytes | Nov. 13, 2003 |
| $gh.tmp | 377 Bytes | Nov. 13, 2003 |
| $ghs1.tmp | 1.57 KB | Nov. 13, 2003 |
| $ghw1.tmp | 1.21 KB | Nov. 13, 2003 |
| $ghw2.tmp | 1.27 KB | Nov. 13, 2003 |
| $ghw3.tmp | 1.33 KB | Nov. 13, 2003 |
| $ghw4.tmp | 1.40 KB | Nov. 13, 2003 |
| $ghw5.tmp | 1.46 KB | Nov. 13, 2003 |
| $ghw6.tmp | 1.52 KB | Nov. 13, 2003 |
| $ghw7.tmp | 1.58 KB | Nov. 13, 2003 |
| $ghw8.tmp | 1.65 KB | Nov. 13, 2003 |
| $MPM001.txt.tmp | 29 Bytes | Nov. 13, 2003 |
| $MPM002.txt.tmp | 20 Bytes | Nov. 13, 2003 |
| $MPM003.txt.tmp | 20 Bytes | Nov. 13, 2003 |
| $MPM004.txt.tmp | 20 Bytes | Nov. 13, 2003 |
| $MPM005.txt.tmp | 20 Bytes | Nov. 13, 2003 |
| $MPM006.txt.tmp | 20 Bytes | Nov. 13, 2003 |
| $MPM007.txt.tmp | 20 Bytes | Nov. 13, 2003 |
| $MPM008.txt.tmp | 20 Bytes | Nov. 13, 2003 |
| $MPM009.txt.tmp | 20 Bytes | Nov. 13, 2003 |
| $MPM010.txt.tmp | 20 Bytes | Nov. 13, 2003 |
| $MPM011.txt.tmp | 20 Bytes | Nov. 13, 2003 |
| $MPM012.txt.tmp | 20 Bytes | Nov. 13, 2003 |
| $MPM013.txt.tmp | 20 Bytes | Nov. 13, 2003 |
| $MPM014.txt.tmp | 20 Bytes | Nov. 13, 2003 |
| $MPM015.txt.tmp | 20 Bytes | Nov. 13, 2003 |
| $MPM016.txt.tmp | 20 Bytes | Nov. 13, 2003 |
| $MPM017.txt.tmp | 20 Bytes | Nov. 13, 2003 |
| $MPM018.txt.tmp | 20 Bytes | Nov. 13, 2003 |
| $MPM019.txt.tmp | 20 Bytes | Nov. 13, 2003 |
| $MPM020.txt.tmp | 20 Bytes | Nov. 13, 2003 |
| $MPM021.txt.tmp | 20 Bytes | Nov. 13, 2003 |
| $MPM022.txt.tmp | 20 Bytes | Nov. 13, 2003 |
| $MPM023.txt.tmp | 20 Bytes | Nov. 13, 2003 |
| $MPM024.txt.tmp | 20 Bytes | Nov. 13, 2003 |
| $MPM025.txt.tmp | 20 Bytes | Nov. 13, 2003 |
| $MPM026.txt.tmp | 20 Bytes | Nov. 13, 2003 |
| $MPM027.txt.tmp | 20 Bytes | Nov. 13, 2003 |
| $MPM028.txt.tmp | 20 Bytes | Nov. 13, 2003 |
| $MPM029.txt.tmp | 20 Bytes | Nov. 13, 2003 |
| $MPM030.txt.tmp | 20 Bytes | Nov. 13, 2003 |
| $MPM031.txt.tmp | 20 Bytes | Nov. 13, 2003 |
| $MPM032.txt.tmp | 20 Bytes | Nov. 13, 2003 |
| $MPM033.txt.tmp | 20 Bytes | Nov. 13, 2003 |
| $MPM034.txt.tmp | 20 Bytes | Nov. 13, 2003 |
| $MPM035.txt.tmp | 20 Bytes | Nov. 13, 2003 |
| $MPM036.txt.tmp | 20 Bytes | Nov. 13, 2003 |
| $MPM037.txt.tmp | 20 Bytes | Nov. 13, 2003 |
| $MPM038.txt.tmp | 20 Bytes | Nov. 13, 2003 |
| $MPM039.txt.tmp | 20 Bytes | Nov. 13, 2003 |
| $MPM040.txt.tmp | 20 Bytes | Nov. 13, 2003 |
| $MPM041.txt.tmp | 20 Bytes | Nov. 13, 2003 |
| $MPM042.txt.tmp | 20 Bytes | Nov. 13, 2003 |
| $MPM043.txt.tmp | 20 Bytes | Nov. 13, 2003 |
| $MPM044.txt.tmp | 20 Bytes | Nov. 13, 2003 |
| $MPM045.txt.tmp | 20 Bytes | Nov. 13, 2003 |
| $MPM046.txt.tmp | 20 Bytes | Nov. 13, 2003 |
| $MPM047.txt.tmp | 20 Bytes | Nov. 13, 2003 |
| $MPM048.txt.tmp | 20 Bytes | Nov. 13, 2003 |
| $MPM049.txt.tmp | 20 Bytes | Nov. 13, 2003 |
| $MPM050.txt.tmp | 20 Bytes | Nov. 13, 2003 |
| $MPM051.txt.tmp | 20 Bytes | Nov. 13, 2003 |
| $MPM052.txt.tmp | 20 Bytes | Nov. 13, 2003 |
| $MPM053.txt.tmp | 20 Bytes | Nov. 13, 2003 |
| $MPM054.txt.tmp | 20 Bytes | Nov. 13, 2003 |
| $MPM055.txt.tmp | 20 Bytes | Nov. 13, 2003 |
| $MPM056.txt.tmp | 20 Bytes | Nov. 13, 2003 |
| $MPM057.txt.tmp | 20 Bytes | Nov. 13, 2003 |
| $MPM058.txt.tmp | 20 Bytes | Nov. 13, 2003 |
| $MPM059.txt.tmp | 20 Bytes | Nov. 13, 2003 |
| $MPM060.txt.tmp | 20 Bytes | Nov. 13, 2003 |
| $MPM061.txt.tmp | 20 Bytes | Nov. 13, 2003 |
| $MPM062.txt.tmp | 20 Bytes | Nov. 13, 2003 |
| $MPM063.txt.tmp | 20 Bytes | Nov. 13, 2003 |
| $MPM064.txt.tmp | 20 Bytes | Nov. 13, 2003 |
| tmpmode.txt | 18 Bytes | Nov. 13, 2003 |
| $APINFO | 124 Bytes | Nov. 13, 2003 |
| $TRACE01 | 265 Bytes | Nov. 13, 2003 |
| pm_m | 1.33 KB | Nov. 13, 2003 |
| pm_s | 198 Bytes | Nov. 13, 2003 |

-continued

DISC 1 (FOR APPENDIX A)

| File Name | Size in bytes | Date |
|---|---|---|
| $GH | 214 Bytes | Nov. 13, 2003 |
| $GH59 | 3.33 KB | Nov. 14, 2003 |
| $GH59_01 | 428 Bytes | Nov. 14, 2003 |
| $PROMAPH | 352 Bytes | Nov. 14, 2003 |
| $SFINDEX | 2.13 KB | Nov. 13, 2003 |
| $ESLOT02 | 224 Bytes | Nov. 14, 2003 |
| $CREG | 32.0 KB | Nov. 13, 2003 |
| $MREG | 64.0 KB | Nov. 13, 2003 |
| $CPUMNG | 1.06 KB | Nov. 14, 2003 |
| $FILEMNG | 688 Bytes | Nov. 14, 2003 |
| $moddef | 1.23 KB | Nov. 13, 2003 |
| $PCDEF | 1.04 KB | Nov. 13, 2003 |
| $SVCFG01.TDF | 336 Bytes | Nov. 13, 2003 |
| $svcfg01.tdt | 1.40 KB | Nov. 13, 2003 |
| $svcfg02.tdf | 336 Bytes | Nov. 13, 2003 |
| $svcfg02.tdt | 1.40 KB | Nov. 13, 2003 |
| $svcfg04.tdf | 336 Bytes | Nov. 13, 2003 |
| $svcfg04.tdt | 2.69 KB | Nov. 13, 2003 |
| $svdxxxx.TDF | 180 Bytes | Nov. 13, 2003 |
| $USERMNG | 288 Bytes | Nov. 13, 2003 |

DISC 2 (FOR APPENDIX B)

| File Name | Size in bytes | Date |
|---|---|---|
| GCMT.IDX | 66 KB | July 27, 2004 |
| GXRF.DAT | 235 KB | July 24, 2004 |
| GXRF.IDX | 107 KB | July 24, 2004 |
| dwg.bld | 3.76 KB | Aug. 4, 1997 |
| I00.CMT | 61 Bytes | Nov. 20, 2003 |
| I.CMT | 41 Bytes | Nov. 20, 2003 |
| IB$$$00.BAK | 4.71 KB | Oct. 15, 2001 |
| IW$$$00.CMT | 6.87 KB | Dec. 29, 2003 |
| IB$$$00.CMT | 9.35 KB | July 13, 2004 |
| OB$$$00.CMT | 13.6 KB | July 24, 2004 |
| OW$$$00.CMT | 8.31 KB | Dec. 29, 2003 |
| S.CMT | 25.1 KB | Dec. 29, 2003 |
| A00.CMT | 51 Bytes | Nov. 20, 2003 |
| A.CMT | 31 Bytes | Nov. 20, 2003 |
| H00.CMT | 55 Bytes | Nov. 20, 2003 |
| H01.CMT | 813 Bytes | Jan. 3, 2004 |
| H02.CMT | 88 Bytes | Sep. 16, 2002 |
| H03.CMT | 84 Bytes | Jan. 30, 2002 |
| H04.CMT | 216 Bytes | Nov. 2, 2003 |
| H05.CMT | 3.15 KB | Dec. 13, 2003 |
| H06.CMT | 3.21 KB | Dec. 13, 2003 |
| H07.CMT | 819 Bytes | July 25, 2003 |
| H08.CMT | 85 Bytes | July 19, 2003 |
| H09.CMT | 531 Bytes | July 30, 2003 |
| H10.CMT | 86 Bytes | Dec. 10, 2003 |
| H11.CMT | 87 Bytes | July 27, 2003 |
| H12.CMT | 87 Bytes | July 27, 2003 |
| H13.CMT | 243 Bytes | July 27, 2003 |
| H14.CMT | 85 Bytes | July 27, 2003 |
| H15.CMT | 85 Bytes | July 27, 2003 |
| H16.CMT | 83 Bytes | July 27, 2003 |
| H17.CMT | 83 Bytes | July 27, 2003 |
| H18.CMT | 87 Bytes | July 27, 2003 |
| H19.CMT | 84 Bytes | July 27, 2003 |
| H20.CMT | 87 Bytes | July 27, 2003 |
| H21.CMT | 77 Bytes | July 27, 2003 |
| H22.CMT | 99 Bytes | Dec. 26, 2003 |
| H23.CMT | 96 Bytes | Dec. 26, 2003 |
| H25.CMT | 187 Bytes | May 10, 2004 |
| H28.CMT | 204 Bytes | Dec. 26, 2003 |
| H30.CMT | 102 Bytes | May 6, 2002 |
| H31.CMT | 182 Bytes | Jan. 4, 2004 |
| H32.CMT | 485 Bytes | Dec. 26, 2003 |
| H33.CMT | 81 Bytes | Nov. 2, 2003 |
| H34.CMT | 107 Bytes | June 9, 2003 |

-continued

DISC 2 (FOR APPENDIX B)

| File Name | Size in bytes | Date |
|---|---|---|
| H41.CMT | 91 Bytes | July 26, 2004 |
| H50.CMT | 84 Bytes | Nov. 1, 2002 |
| H51.CMT | 76 Bytes | July 19, 2003 |
| H52.CMT | 629 Bytes | Dec. 10, 2003 |
| H53.CMT | 87 Bytes | July 25, 2003 |
| H54.CMT | 613 Bytes | July 31, 2003 |
| H55.CMT | 389 Bytes | July 31, 2003 |
| H56.CMT | 284 Bytes | May 19, 2003 |
| H57.CMT | 649 Bytes | Nov. 21, 2003 |
| H58.CMT | 56 Bytes | Oct. 13, 2003 |
| H59.CMT | 1.70 KB | July 26, 2004 |
| H61.CMT | 81 Bytes | Oct. 26, 2003 |
| H64.CMT | 179 Bytes | July 24, 2004 |
| H65.CMT | 179 Bytes | July 24, 2004 |
| H66.CMT | 92 Bytes | July 8, 2003 |
| H70.CMT | 101 Bytes | Dec. 14, 2003 |
| H71.CMT | 74 Bytes | Oct. 13, 2003 |
| H0101.CMT | 93 Bytes | Apr. 21, 2003 |
| H0301.CMT | 112 Bytes | Feb. 5, 2004 |
| H0303.CMT | 82 Bytes | Sep. 16, 2002 |
| H0304.CMT | 104 Bytes | June 12, 2003 |
| H0305.CMT | 104 Bytes | June 12, 2003 |
| H0306.CMT | 102 Bytes | July 25, 2003 |
| H0307.CMT | 82 Bytes | July 25, 2003 |
| H0308.CMT | 86 Bytes | July 25, 2003 |
| H0309.CMT | 103 Bytes | July 25, 2003 |
| H0310.CMT | 86 Bytes | July 25, 2003 |
| H5901.CMT | 438 Bytes | July 26, 2004 |
| H5902.CMT | 84 Bytes | July 24, 2004 |
| H5903.CMT | 668 Bytes | July 26, 2004 |
| H.CMT | 75 Bytes | May 10, 2004 |
| I00.CMT | 61 Bytes | Nov. 20, 2003 |
| I.CMT | 41 Bytes | Nov. 20, 2003 |
| L00.CMT | 59 Bytes | Nov. 20, 2003 |
| L01.CMT | 139 Bytes | Jan. 31, 2002 |
| L04.CMT | 84 Bytes | July 27, 2003 |
| L05.CMT | 93 Bytes | July 27, 2003 |
| L06.CMT | 93 Bytes | July 27, 2003 |
| L07.CMT | 143 Bytes | July 27, 2003 |
| L08.CMT | 95 Bytes | July 27, 2003 |
| L12.CMT | 89 Bytes | Dec. 26, 2003 |
| L17.CMT | 99 Bytes | July 27, 2003 |
| L20.CMT | 76 Bytes | Jan. 31, 2002 |
| L25.CMT | 96 Bytes | Jan. 31, 2002 |
| L30.CMT | 100 | Jan. 31, 2002 |
| L41.CMT | 205 Bytes | July 26, 2004 |
| L42.CMT | 80 Bytes | July 24, 2004 |
| L45.CMT | 82 Bytes | Nov. 24, 2003 |
| L47.CMT | 96 Bytes | Aug. 12, 2002 |
| L63.CMT | 115 Bytes | June 9, 2003 |
| L99.CMT | 82 Bytes | Jan. 4, 2004 |
| L.CMT | 39 Bytes | Nov. 20, 2003 |
| COUNTER.CMT | 408 Bytes | Nov. 20, 2003 |
| DTRC-RD.CMT | 507 Bytes | Nov. 20, 2003 |
| FINFOUT.CMT | 353 Bytes | Nov. 20, 2003 |
| FTRC-RD.CMT | 427 Bytes | Nov. 20, 2003 |
| ICNS-RD.CMT | 550 Bytes | Nov. 20, 2003 |
| ICNS-WR.CMT | 548 Bytes | Nov. 20, 2003 |
| ISET-213.CMT | 398 Bytes | Nov. 20, 2003 |
| ITRC-RD.CMT | 537 Bytes | Nov. 20, 2003 |
| MSG-RCV.CMT | 894 Bytes | Nov. 20, 2003 |
| MSG-SND.CMT | 882 Bytes | Nov. 20, 2003 |
| TRACE.CMT | 234 Bytes | Nov. 20, 2003 |
| IB$$$OO.BACK | 4.71 KB | Oct. 15, 2001 |
| IB$$$00.CMT | 9.35 KB | July 13, 2004 |
| IW$$$00CMT | 6.87 KB | Dec. 29, 2003 |
| #7654321.TMP | 1 Byte | Aug. 18, 2001 |
| MB$$$00.CMT | 92.4 KB | July 26, 2004 |
| MW$$$00.CMT | 125 KB | July 24, 2004 |
| $REGSET | 4.54 KB | July 27, 2004 |
| $REGSET.ORG | 4.34 KB | Nov. 20, 2003 |
| $gh91.tmp | 1.30 KB | July 24, 2004 |
| $gh92.tmp | 1.49 KB | July 24, 2004 |
| $gh93.tmp | 1.67 KB | July 24, 2004 |
| $gh94.tmp | 1.86 KB | July 24, 2004 |

-continued

DISC 2 (FOR APPENDIX B)

| File Name | Size in bytes | Date |
|---|---|---|
| $gh95.tmp | 2.05 KB | July 24, 2004 |
| $gh96.tmp | 2.24 KB | July 24, 2004 |
| $gh97.tmp | 2.42 KB | July 24, 2004 |
| $gh98.tmp | 2.61 KB | July 24, 2004 |
| $gh99.tmp | 198 Bytes | July 24, 2004 |
| $gh.tmp | 377 Bytes | July 24, 2004 |
| $ghs1.tmp | 1.57 KB | July 24, 2004 |
| $ghw1.tmp | 1.21 KB | July 24, 2004 |
| $ghw2.tmp | 1.27 KB | July 24, 2004 |
| $ghw3.tmp | 1.33 KB | July 24, 2004 |
| $ghw4.tmp | 1.40 KB | July 24, 2004 |
| $ghw5.tmp | 1.46 KB | July 24, 2004 |
| $ghw6.tmp | 1.52 KB | July 24, 2004 |
| $ghw7.tmp | 1.58 KB | July 24, 2004 |
| $ghw8.tmp | 1.65 KB | July 24, 2004 |
| $MPM001.txt.tmp | 20 Bytes | July 24, 2004 |
| $MPM002.txt.tmp | 20 Bytes | July 24, 2004 |
| $MPM003.txt.tmp | 20 Bytes | July 24, 2004 |
| $MPM004.txt.tmp | 20 Bytes | July 24, 2004 |
| $MPM005.txt.tmp | 20 Bytes | July 24, 2004 |
| $MPM006.txt.tmp | 20 Bytes | July 24, 2004 |
| $MPM007.txt.tmp | 20 Bytes | July 24, 2004 |
| $MPM008.txt.tmp | 20 Bytes | July 24, 2004 |
| $MPM009.txt.tmp | 20 Bytes | July 24, 2004 |
| $MPM010.txt.tmp | 20 Bytes | July 24, 2004 |
| $MPM011.txt.tmp | 20 Bytes | July 24, 2004 |
| $MPM012.txt.tmp | 20 Bytes | July 24, 2004 |
| $MPM013.txt.tmp | 20 Bytes | July 24, 2004 |
| $MPM014.txt.tmp | 20 Bytes | July 24, 2004 |
| $MPM015.txt.tmp | 20 Bytes | July 24, 2004 |
| $MPM016.txt.tmp | 20 Bytes | July 24, 2004 |
| $MPM017.txt.tmp | 20 Bytes | July 24, 2004 |
| $MPM018.txt.tmp | 20 Bytes | July 24, 2004 |
| $MPM019.txt.tmp | 20 Bytes | July 24, 2004 |
| $MPM020.txt.tmp | 20 Bytes | July 24, 2004 |
| $MPM021.txt.tmp | 20 Bytes | July 24, 2004 |
| $MPM022.txt.tmp | 20 Bytes | July 24, 2004 |
| $MPM023.txt.tmp | 20 Bytes | July 24, 2004 |
| $MPM024.txt.tmp | 20 Bytes | July 24, 2004 |
| $MPM025.txt.tmp | 20 Bytes | July 24, 2004 |
| $MPM026.txt.tmp | 20 Bytes | July 24, 2004 |
| $MPM027.txt.tmp | 20 Bytes | July 24, 2004 |
| $MPM028.txt.tmp | 20 Bytes | July 24, 2004 |
| $MPM029.txt.tmp | 20 Bytes | July 24, 2004 |
| $MPM030.txt.tmp | 20 Bytes | July 24, 2004 |
| $MPM031.txt.tmp | 20 Bytes | July 24, 2004 |
| $MPM032.txt.tmp | 20 Bytes | July 24, 2004 |
| $MPM033.txt.tmp | 20 Bytes | July 24, 2004 |
| $MPM034.txt.tmp | 20 Bytes | July 24, 2004 |
| $MPM035.txt.tmp | 20 Bytes | July 24, 2004 |
| $MPM036.txt.tmp | 20 Bytes | July 24, 2004 |
| $MPM037.txt.tmp | 20 Bytes | July 24, 2004 |
| $MPM038.txt.tmp | 20 Bytes | July 24, 2004 |
| $MPM039.txt.tmp | 20 Bytes | July 24, 2004 |
| $MPM040.txt.tmp | 20 Bytes | July 24, 2004 |
| $MPM041.txt.tmp | 20 Bytes | July 24, 2004 |
| $MPM042.txt.tmp | 20 Bytes | July 24, 2004 |
| $MPM043.txt.tmp | 20 Bytes | July 24, 2004 |
| $MPM044.txt.tmp | 20 Bytes | July 24, 2004 |
| $MPM045.txt.tmp | 20 Bytes | July 24, 2004 |
| $MPM046.txt.tmp | 20 Bytes | July 24, 2004 |
| $MPM047.txt.tmp | 20 Bytes | July 24, 2004 |
| $MPM048.txt.tmp | 20 Bytes | July 24, 2004 |
| $MPM049.txt.tmp | 20 Bytes | July 24, 2004 |
| $MPM050.txt.tmp | 20 Bytes | July 24, 2004 |
| $MPM051.txt.tmp | 20 Bytes | July 24, 2004 |
| $MPM052.txt.tmp | 20 Bytes | July 24, 2004 |
| $MPM053.txt.tmp | 20 Bytes | July 24, 2004 |
| $MPM054.txt.tmp | 20 Bytes | July 24, 2004 |
| $MPM055.txt.tmp | 20 Bytes | July 24, 2004 |
| $MPM056.txt.tmp | 20 Bytes | July 24, 2004 |
| $MPM057.txt.tmp | 20 Bytes | July 24, 2004 |
| $MPM058.txt.tmp | 20 Bytes | July 24, 2004 |
| $MPM059.txt.tmp | 20 Bytes | July 24, 2004 |
| $MPM060.txt.tmp | 20 Bytes | July 24, 2004 |
| $MPM061.txt.tmp | 20 Bytes | July 24, 2004 |
| $MPM062.txt.tmp | 20 Bytes | July 24, 2004 |
| $MPM063.txt.tmp | 20 Bytes | July 24, 2004 |
| $MPM064.txt.tmp | 20 Bytes | July 24, 2004 |
| tmpmode.txt | 18 Bytes | July 24, 2004 |
| $APINFO | 137 Bytes | July 27, 2004 |
| $SCAN_TB | 112 Bytes | July 24, 2004 |
| $SYSDEF | 192 Bytes | July 24, 2004 |
| $TRACE01 | 214 Bytes | July 24, 2004 |
| $TRACE02 | 350 Bytes | July 24, 2004 |
| $TRACE03 | 358 Bytes | July 24, 2004 |
| $TRACE04 | 316 Bytes | July 24, 2004 |
| $GRPDEF | 1.00 KB | July 24, 2004 |
| $MPM001 | 2.12 KB | July 24, 2004 |
| $PROMAPT | 176 Bytes | July 24, 2004 |
| pm_m | 1.33 KB | July 24, 2004 |
| pm_s | 198 Bytes | July 24, 2004 |
| $GH | 1.06 KB | July 24, 2004 |
| $GH01 | 3.67 KB | July 24, 2004 |
| $GH01_01 | 1.59 KB | July 24, 2004 |
| $GH02 | 1.56 KB | July 24, 2004 |
| $GH03 | 298 Bytes | July 24, 2004 |
| $GH03_01 | 2.69 KB | July 24, 2004 |
| $GH03_03 | 1.66 KB | July 24, 2004 |
| $GH03_04 | 1.65 KB | July 24, 2004 |
| $GH03_05 | 1.75 KB | July 24, 2004 |
| $GH03_06 | 1.76 KB | July 24, 2004 |
| $GH03_07 | 1.77 KB | July 24, 2004 |
| $GH03_08 | 1.74 KB | July 24, 2004 |
| $GH03_09 | 1.79 KB | July 24, 2004 |
| $GH03_10 | 1.75 KB | July 24, 2004 |
| $GH04 | 2.09 KB | July 24, 2004 |
| $GH05 | 7.57 KB | July 24, 2004 |
| $GH06 | 7.65 KB | July 24, 2004 |
| $GH07 | 9.53 KB | July 24, 2004 |
| $GH08 | 1.23 KB | July 24, 2004 |
| $GH09 | 3.13 KB | July 24, 2004 |
| $GH10 | 1.58 KB | July 24, 2004 |
| $GH11 | 1.73 KB | July 24, 2004 |
| $GH12 | 1.73 KB | July 24, 2004 |
| $GH13 | 1.96 KB | July 24, 2004 |
| $GH14 | 1.83 KB | July 24, 2004 |
| $GH15 | 1.77 KB | July 24, 2004 |
| $GH16 | 1.92 KB | July 24, 2004 |
| $GH17 | 1.82 KB | July 24, 2004 |
| $GH18 | 1.83 KB | July 24, 2004 |
| $GH19 | 1.89 KB | July 24, 2004 |
| $GH20 | 1.95 KB | July 24, 2004 |
| $GH21 | 2.98 KB | July 24, 2004 |
| $GH22 | 4.45 KB | July 24, 2004 |
| $GH23 | 2.59 KB | July 24, 2004 |
| $GH25 | 3.45 KB | July 24, 2004 |
| $GH27 | 6.60 KB | July 24, 2004 |
| $GH28 | 4.36 KB | July 24, 2004 |
| $GH29 | 724 Bytes | July 24, 2004 |
| $GH30 | 2.15 KB | July 24, 2004 |
| $GH31 | 2.39 KB | July 24, 2004 |
| $GH32 | 3.24 KB | July 24, 2004 |
| $GH33 | 1.52 KB | July 24, 2004 |
| $GH41 | 2.84 KB | July 24, 2004 |
| $GH50 | 1.77 KB | July 24, 2004 |
| $GH51 | 2.20 KB | July 24, 2004 |
| $GH52 | 2.22 KB | July 24, 2004 |
| $GH53 | 1.05 KB | July 24, 2004 |
| $GH54 | 2.06 KB | July 24, 2004 |
| $GH55 | 1.10 KB | July 24, 2004 |
| $GH56 | 621 Bytes | July 24, 2004 |
| $GH57 | 1.98 KB | July 24, 2004 |
| $GH58 | 938 Bytes | July 24, 2004 |
| $GH59 | 4.10 KB | July 26, 2004 |
| $GH59_01 | 3.92 KB | July 26, 2004 |
| $GH59_02 | 2.03 KB | July 26, 2004 |
| $GH59_03 | 2.40 KB | July 26, 2004 |
| $GH60 | 1.64 KB | July 24, 2004 |
| $GH61 | 422 Bytes | July 24, 2004 |

-continued

DISC 2 (FOR APPENDIX B)

| File Name | Size in bytes | Date |
| --- | --- | --- |
| $GH62 | 1.28 KB | July 24, 2004 |
| $GH63 | 783 Bytes | July 24, 2004 |
| $GH64 | 2.84 KB | July 24, 2004 |
| $GH65 | 2.84 KB | July 24, 2004 |
| $GH66 | 1.31 KB | July 24, 2004 |
| $GH70 | 849 Bytes | July 24, 2004 |
| $PROMAPH | 6.06 KB | July 26, 2004 |
| $GL | 388 Bytes | July 24, 2004 |
| $GL01 | 787 Bytes | July 24, 2004 |
| $GL04 | 1.32 KB | July 24, 2004 |
| $GL05 | 2.52 KB | July 24, 2004 |
| $GL06 | 2.32 KB | July 24, 2004 |
| $GL07 | 2.00 KB | July 24, 2004 |
| $GL08 | 1.33 KB | July 24, 2004 |
| $GL10 | 477 Bytes | July 24, 2004 |
| $GL12 | 2.32 KB | July 24, 2004 |
| $GL17 | 1.85 KB | July 24, 2004 |
| $GL20 | 4.26 KB | July 24, 2004 |
| $GL25 | 2.47 KB | July 24, 2004 |
| $GL30 | 1.05 KB | July 24, 2004 |
| $GL41 | 1.82 KB | July 26, 2004 |
| $GL42 | 3.25 KB | July 24, 2004 |
| $GL45 | 3.47 KB | July 24, 2004 |
| $GL47 | 836 Bytes | July 24, 2004 |
| $GL99 | 2.73 KB | July 24, 2004 |
| $PROMAPL | 1.75 KB | July 26, 2004 |
| $SFINDEX | 2.17 KB | July 24, 2004 |
| $ECFG03 | 5.88 KB | July 24, 2004 |
| $ECFG05 | 5.88 KB | July 24, 2004 |
| $ESLOT02 | 304 Bytes | July 24, 2004 |
| $ESLOT03 | 416 Bytes | July 24, 2004 |
| $ESLOT05 | 416 Bytes | July 24, 2004 |
| $ESLOT07 | 224 Bytes | July 24, 2004 |
| $SLTOCFG | 944 Bytes | July 24, 2004 |
| $SSLOT00 | 192 Bytes | July 24, 2004 |
| $DBINFO | 144 Bytes | July 24, 2004 |
| $CREG | 32.0 KB | July 24, 2004 |
| $MREG | 64.0 KB | July 24, 2004 |
| $HTBLMAP | 48 Bytes | July 24, 2004 |
| $CPUMNG | 1.06 KB | July 27, 2004 |
| $FILEMNG | 64 Bytes | July 27, 2004 |
| $moddef | 1.17 KB | July 24, 2004 |
| $PCDEF | 1.04 KB | July 24, 2004 |
| $SVCFG01.TDF | 336 Bytes | July 24, 2004 |
| $svcfg01.tdt | 1.40 KB | July 24, 2004 |
| $svcfg02.tdf | 336 Bytes | July 24, 2004 |
| $svcfg02.tdt | 1.40 KB | July 24, 2004 |
| $svcfg04.tdf | 336 Bytes | July 24, 2004 |
| $svcfg04.tdt | 2.69 KB | July 24, 2004 |
| $svdxxxx.TDF | 180 Bytes | July 24, 2004 |
| $USERMNG | 192 Bytes | July 24, 2004 |

BACKGROUND OF THE INVENTION

1. Field of the Invention

The present invention relates to an apparatus for inspecting and verifying the quality of package seals, especially yet optionally hermetically sealed packages, and further relates to methods for inspecting package seals.

2. Description of the Related Art

Quality packaging has become an integral component in the advertisement and sale of various consumer products and commodities. For example, food products such as snack foods, meat, fish and poultry and perishable items are often hermetically sealed in flexible and/or rigid packages. The hermetic seal serves several functions. In the event fragile items such as potato chips are located in the package, an air cushion locked in the hermetic seal may serve to guard the packaged contents from damage. The hermetic seal may also serve to preserve freshness of the packaged contents. Additionally, consumers often will associate broken seals with tampering or lack of freshness, and may reject a product lacking a proper seal. It is therefore highly desirable to subject packages to a process by which a seal on the package is checked for integrity.

SUMMARY OF THE INVENTION

It is an object of this invention to provide an apparatus for inspecting the seal of a package.

It is another object of the invention to provide a seal inspecting apparatus that may be incorporated into a continuous sealing process without a significant adverse effect on processing rates.

It is still another object of the invention to provide a seal inspecting apparatus having excellent versatility for permitting inspection of different types of packages and seals.

It is a further object of the invention to provide a seal inspecting apparatus capable of data collection and data analysis.

A still further object of the invention is to provide methods for attaining and carrying out one or more of the above-mentioned objects.

Yet another object of the invention is to provide data collection mechanisms, programs, and methods for generating data relating to inspection of a package seal.

Yet a further object of the invention is to provide data analysis mechanisms, programs, and methods for analyzing a package seal.

It is still another object of the invention to provide an apparatus and method for inspecting modified atmosphere packaging (MAP), such as used, for example, for packaging meat.

To achieve one or more of the foregoing objects, and in accordance with the purposes of the invention as embodied and broadly described herein, according to a first aspect of this invention there is provided an apparatus for inspecting a package. The apparatus comprises a conveyor for transporting a package along a direction of travel, a presser unit for applying a compressive force to the package traveling on the conveyor, a tracer movable over the upper surface of the package traveling on the conveyor for measuring package height at multiple points along a package dimension moving parallel to the direction of travel, and a processor for determining a trace area of the package from the package height measurements at the multiple points, and for determining the presence of a leak in the package based on the trace area.

A package inspection apparatus according to a second aspect of the invention comprises a conveyor for transporting a plurality of packages along a direction of travel, a presser unit for applying a compressive force to the packages traveling on the conveyor, a tracer movable over upper surfaces of the packages traveling on the conveyor for measuring a package attribute of each one of the packages at multiple points along a package dimension moving parallel to the direction of travel, and a processor for comparing the package attribute measurements of each individual one of the packages to a running average. If the package attribute measurements for the individual one of the packages and the running average are within an acceptable tolerance, the processor updates the running average to average in the package attribute measurements of said individual one of the packages.

A third aspect of the invention provides a method for inspecting a seal of a package. The method comprises transporting a package on a conveyor along a direction of travel, the package having an upper surface and a dimension moving parallel to the direction of travel, applying a compressive force to the package as the package is transported on the conveyor, and moving a tracer over the upper surface of the package traveling on the conveyor for measuring package height at multiple points along the package dimension moving parallel to the direction of travel. A trace area of the package is determined from the package height measurements at the multiple points, and from the trace area a determination is made as to the presence of a leak in the package.

A method for inspecting package seals according to a fourth aspect of the invention comprises transporting a plurality of packages on a conveyor along a direction of travel, applying a compressive force to the packages traveling on the conveyor, moving a tracer over upper surfaces of the packages traveling on the conveyor and measuring a package attribute of each one of the packages at multiple points along a package dimension moving parallel to the direction of travel, and establishing a running average. The package attribute measurements of each individual one of the packages are compared to the running average and, if the package attribute measurements for the individual one of the packages and the running average are within an acceptable tolerance, the running average is updated to average in the package attribute measurements of the individual one of the packages.

BRIEF DESCRIPTION OF THE DRAWINGS

The accompanying drawings are incorporated in and constitute a part of the specification. The drawings, together with the general description given above and the detailed description of the certain preferred embodiments and methods given below, serve to explain the principles of the invention. In such drawings:

FIG. 7A is an isolated, upper perspective view of an upper frame structure and tracer stations of the apparatus of FIG. 1;

FIG. 7B is an enlarged perspective view of a portion of FIG. 7A;

FIG. 10 is an upper perspective view of an apparatus according to another embodiment of the present invention;

FIG. 11 is a front elevation view of the apparatus of FIG. 10; and

FIG. 12 is a side cross-sectional view taken along sectional line XII—XII of FIG. 11.

Figure 1:
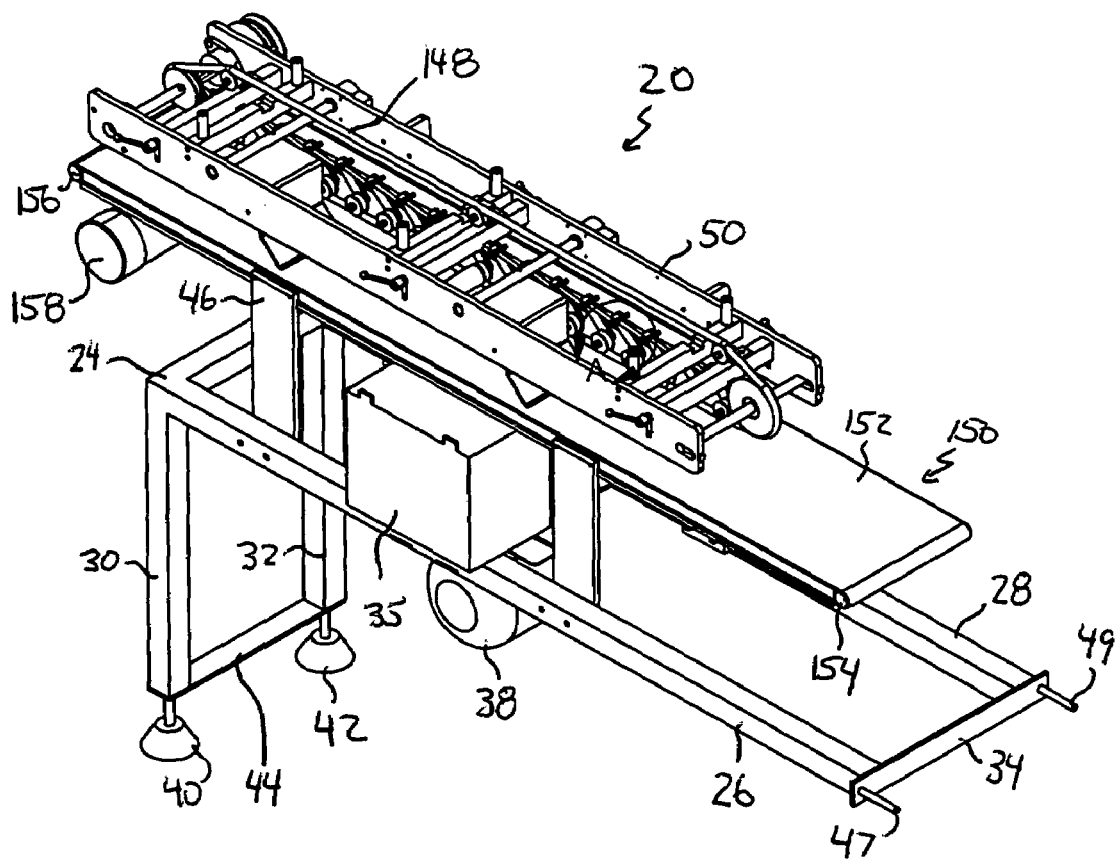
FIG. 1 is an upper perspective view of an apparatus according to an embodiment of the present invention.
Figure 2:
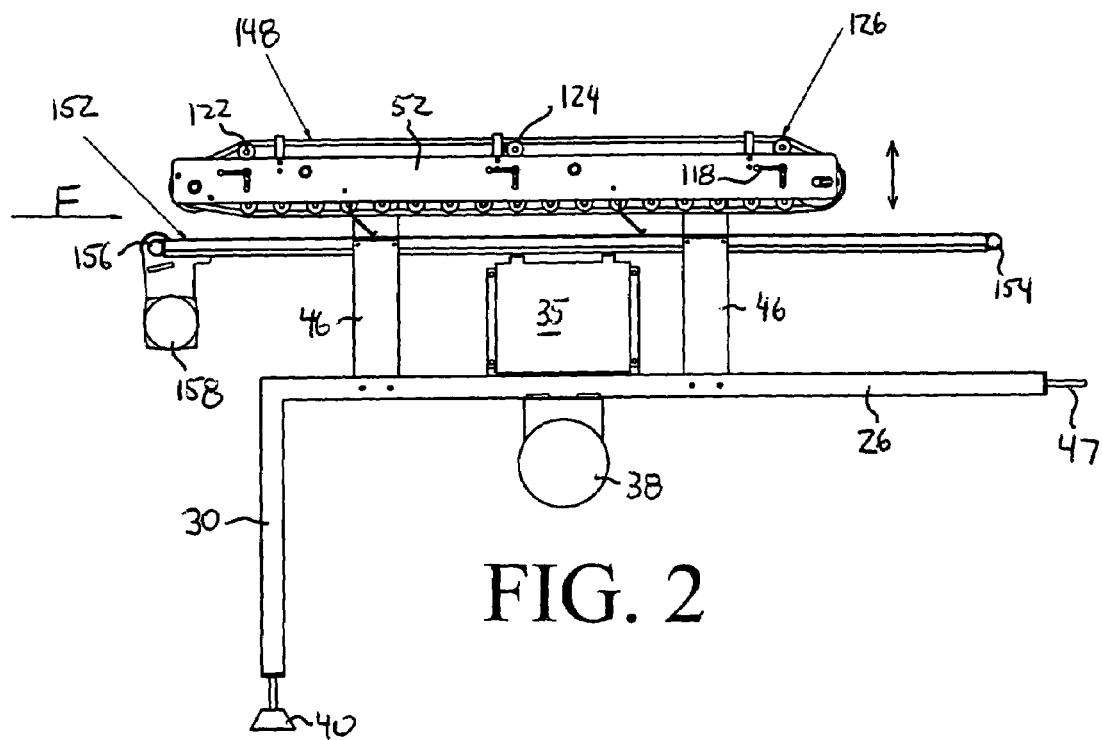
FIG. 2 is a side elevation view of the apparatus of FIG. 1.

DETAILED DESCRIPTION OF CERTAIN PREFERRED EMBODIMENTS AND CERTAIN PREFERRED METHODS OF THE INVENTION

Reference will now be made in detail to the presently preferred embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods.

It is to be noted that, as used in the specification, the singular forms "a," "an," and "the" include plural referents unless the context clearly dictates otherwise.

Figure 6:
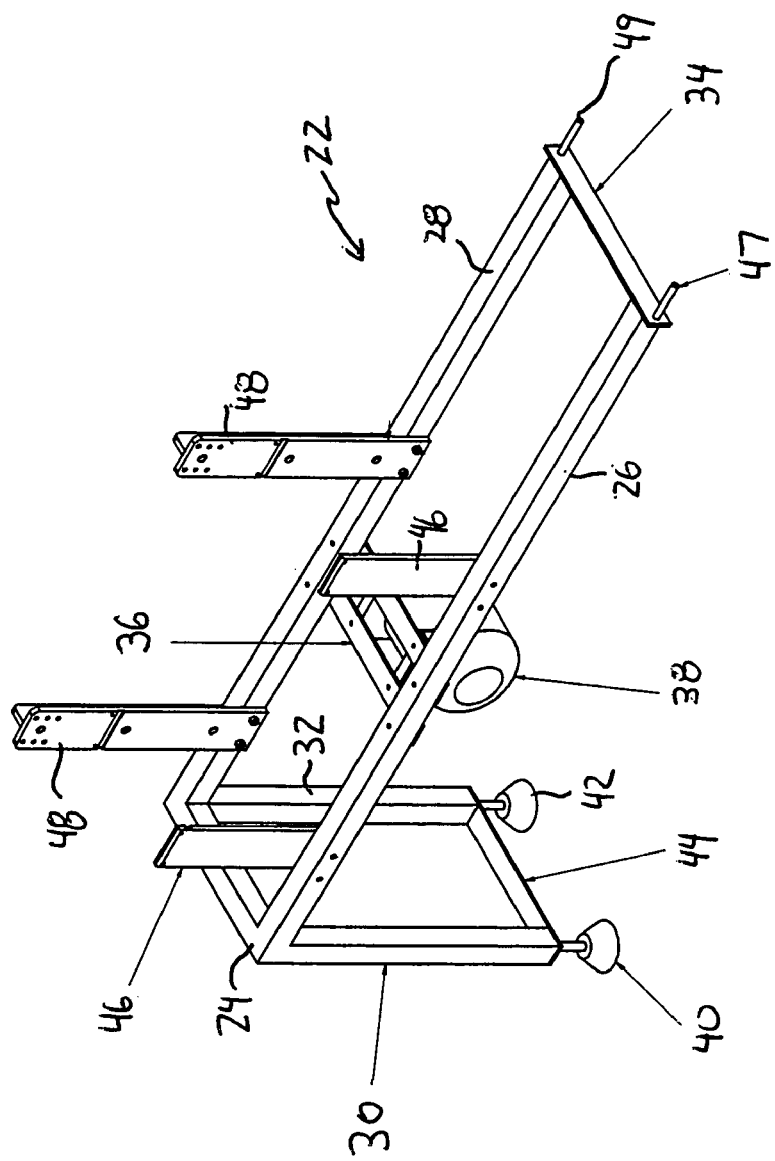
FIG. 6 is an isolated, upper perspective view of a lower frame structure of the apparatus of FIG. 1.
Figure 4:
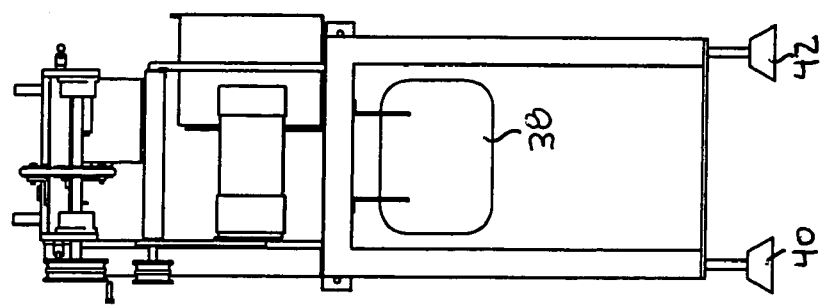
FIG. 4 is an end view of the apparatus of FIG. 1.

A monitoring apparatus according to an embodiment of the invention is illustrated the drawings and generally designated by reference numeral 20 in FIG. 1. Referring to FIGS. 1–4, the inspecting apparatus 20 comprises a lower frame structure generally designated by reference numeral 22 in FIG. 6. The lower frame structure 22 comprises base tubing 24 having two lower horizontal beams 26 and 28, which are parallel to one another. Vertical legs 30 and 32 are joined to first ends of beams 26 and 28, respectively, integrally or with fasteners. A front crossbeam 34 is fastened to and connects the opposite second ends of beams 26 and 28. Extending forward from the front cross beam 34, and parallel and substantially aligned with beams 26 and 28, respectively, are aligning pins 47 and 49. Medial cross members 36 are fastened to and connect medial sections of the beams 26 and 28. Fastened to and suspended from the medial crossbeams 36 is a pressure tank 38. Optionally, an electrical box 35 (FIG. 1) may be mounted on the cross members 36. Feet 40 and 42 situated at the lower extremities of legs 30 and 32 support the lower frame structure 22. A rear crossbeam 44 is fastened to and connects lower portions of the legs 30 and 32. Support pillar sets 46 and 48 are fastened to and extend vertically upward from the horizontally extending beams 26 and 28, respectively.

The monitoring apparatus 20 further comprises an upper frame structure generally designated by reference numeral 50 in FIG. 7A. The upper frame structure 50 comprises two upper horizontal beams 52 and 54, which are parallel to one another and substantially parallel to lower horizontal beams 26 and 28. Spaced along the length of the beams 52 and 54 are cross members 62, 68, and 74, which are parallel to one another and substantially perpendicular to beams 52 and 54. Stand-off members 64 and 66 are seated on cross member 62. Stand-off members 70 and 72 are seated on cross member 68. Stand-off members 76 and 78 are seated on cross member 74. The stand-off members may be used for mounting a safety guard (not shown), such as a polycarbonate railing.

A forward idle shaft 56 located at the forward ends of beams 52 and 54 carries idle pulley 58 mounted on bearing roller 60. A rear drive shaft 80 located at the rear ends of beams 52 and 54 carries drive pulley 82. Fixed at one end of the drive shaft 80 is main pulley 84. Bearing/pillow block 86 is also located on drive shaft 80.

The trace stations will now be described. The first trace station comprises a first rotatable shaft 90 interposed between cross members 68 and 74. The first rotatable shaft 90 is rotationally connected at its opposite ends to the upper horizontal beams 52 and 54, respectively. A first tracer (also referred to herein as a first trace paddle) 92 is attached to the first rotatable shaft 90 for moving along an arcuate path in unison with the shaft 90. FIG. 7B illustrates a seat 94 in the shape of a bolt having a cushioning jacket 96. In a rest position, i.e., when a package is not passing through the apparatus 20, the first tracer 92 is seated on cushioned bolt 94 for limiting downward movement of the first tracer 92 and avoiding direct contact between the first tracer 92 and the flat belt 152. A first encoder 98 is operatively connected to the first rotatable shaft 90. The second trace station comprises a second rotatable shaft 100 interposed between the cross members 62 and 68. The second rotatable shaft 100 is rotatably connected at its opposite ends to the upper horizontal beams 52 and 54, respectively. A second tracer (also referred to herein as a second trace paddle) 102 is attached to the second rotatable shaft 100 and moves in unison with the rotating shaft 100 over an arcuate path. A second encoder 104 is operatively connected to the second rotatable shaft 100. Although not shown, the second tracer includes a limiter seat similar to cushioned bolt 94 of the first tracer station.

Various modifications may be made to the trace stations as illustrated in FIG. 7A. For example, end of trace paddle 92 and end of trace paddle 102 may each include a respective roller or rollers for facilitating movement of the paddles 92, 102 over a conveyed package. According to another optional embodiment, one or both of the trace stations comprises compression rollers on either side of both sides of the trace paddle. The compression rollers maintain tension on the package and supplies the trace paddle a consistent trace surface.

The encoders 98 and 104 measure the degree of rotation of their shafts 90 and 100, respectively. The rotational range of the shafts 90 and 100 may be split into a plurality of increments. For example, each shaft 90/100 has a circular perimeter equaling 360 degrees. In an embodiment of the invention, each degree was split into an average of 88.9 increments (or a total of 3200 increments for 360 degrees). The encoders 98/104 count the number of increments the shafts 90/100 rotate (based on the movement of the attached tracer paddles 92 and 102, respective), and generate an electric signal representing the number of increments measured. The encoding may be based, for example, on the voltage of the electrical signals. The electrical signals are wired to a programmable logic controller (PLC) or equivalent device for interpreting the encoded signal, e.g., based on its voltage. An example of a PLC that may be used for the present invention is a Yaskawa central processing unit (CPU) MP920 CPU01 with a Yaskawa MP920 Pulse-in Module counter card.

Figure 8:
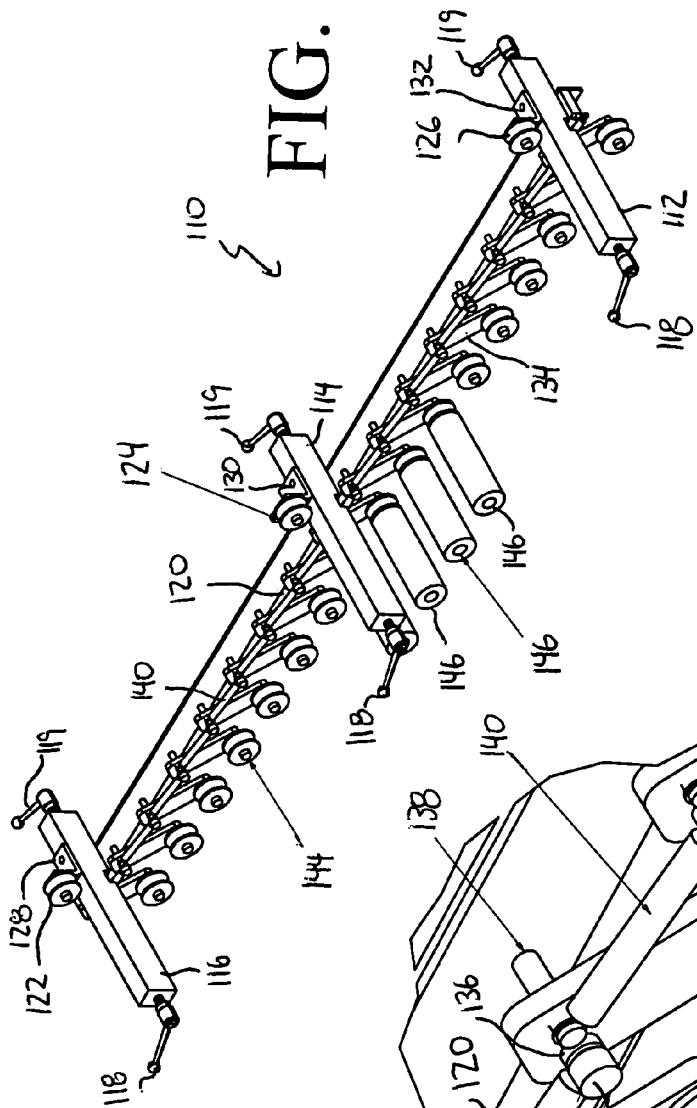
FIG. 8 is an isolated, upper perspective view of a round belt conveyor subassembly and compression station of the apparatus of FIG. 1.

The inspecting apparatus 20 further comprises a round belt conveyor subassembly, generally designated by reference numeral 110 in FIG. 8. The round belt conveyor subassembly 110 comprises forward cross member 112, intermediate cross member 114, and rear cross member 116. Each of the cross members 112, 114, and 116 comprises a respective set of opposite handle clamps 118 and 119, which are described in further detail below. A longitudinal mounting bar 120 is connected to the cross members 112, 114, and 116. The mounting bar 120 is perpendicular to and slightly offset from the lateral midpoint of each of the cross members 112, 114, and 116. Upper guide pulleys 122, 124, and 126 are mounted on the top of the cross members 112, 114, and 116, respectively, via mounting brackets 128, 130, and 132, respectively.

Figure 5:
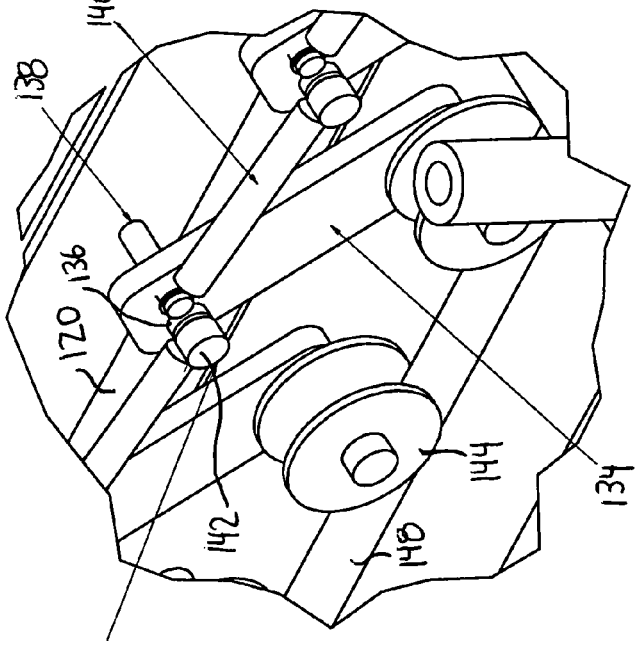
FIG. 5 is an enlarged view of a portion of the upper conveyor mechanism of FIG. 1.

Referring to FIGS. 5 and 8, the round belt conveyor assembly 110 further comprises a plurality of linkages 134. The linkages 134 are arranged at substantially the same height to one another, and are aligned with one another along the direction of package movement, preferably at a fixed interval. Each of the linkages 134 has an upper end portion containing first and second apertures for receiving a corresponding bolt 142 and a corresponding threaded stud 138, respectively. The bolts 142 have threaded ends coupled to threaded apertures (not shown) of the mounting bar 120. Brass bushings 136 are provided for permitting pivotal movement of the linkages 134 relative to their respective bolts 142.

Each of the linkages 134 has a distal or lower end portion coupled to a respective guide pulley 144. A round belt 148 is seated in the grooves of the upper guide pulleys 122, 124, and 126 and the lower guide pulleys 144, as well as in the grooves of the idle pulley 58 and the drive pulley 82 to form a continuous loop. As referred to herein, the terms "round" and "loop," when used in relation to descriptions of the belt 148, do not necessarily mean circular, but may include non-circular continuous paths, such as oval paths and the like.

A plurality of compression springs 140 interconnects the linkages 134 to one another. Each of the compression springs 140 has an upstream end mounted to a corresponding threaded stud 138 of a given linkage "n" and a downstream end mounted to a corresponding bolt 142 of an adjacent downstream linkage "n+1". The compressive force of the springs 140 urges the linkages lower guide pulleys 114 downward to keep the belt 148 under tension.

A plurality (e.g., three in the illustrated embodiment) of the lower guide pulleys 144 are coaxially aligned with and coupled to respective compression rollers 146. The compression rollers 146 may be made of, for example, polymeric material, such as high molecular weight nylon.

Figure 3:
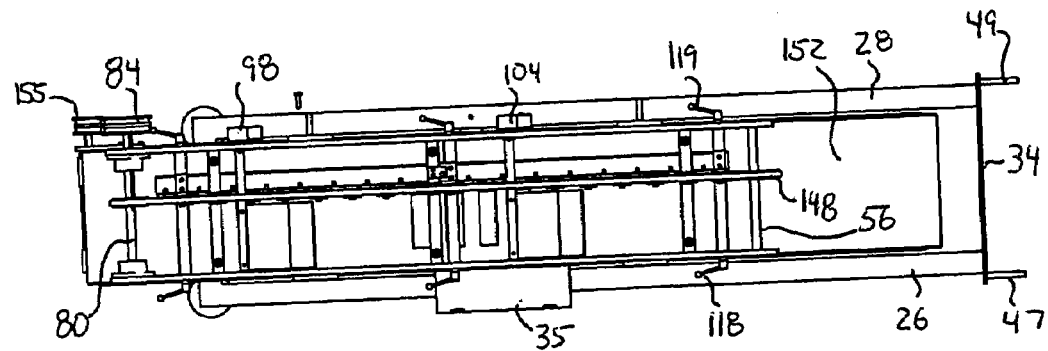
FIG. 3 is an overhead view of the apparatus of FIG. 1.

Referring back to FIGS. 1–3, the inspecting apparatus 20 further comprises a flat belt subassembly 150 comprising flat belt 152 and front and rear rollers 154 and 156. The flat belt subassembly further comprises a motor contained in housing 158. In FIG. 3, the motor is shown connected to pulley 155, which is coaxial with and drives roller 156. The motor is also connected to main pulley 84 in FIG. 3, and a "FIG. 8" shaped belt (not shown) connects the drive motor (or roller 156) to the main pulley. Rotation of the main pulley 84 is intended to rotate drive shaft 80 and pulley 82. In a more preferred embodiment, however, the "FIG. 8" belt is removed, and the top and bottom belts are driven with separate motors. A speed controller operates the separate motors to match the belt speeds.

The inspecting apparatus 20 is made as follows. The flat belt subassembly 150 is attached to support pillars 46 and 48 with a fastener (e.g., bolt, screw, rivet, etc.). The round belt conveyor subassembly 110 is situated above the flat belt subassembly 150 and attached to the upper ends of the support pillars 46 and 48 with fasteners. The aligning pins 47 and 49 are connected to a structure, preferably part of a continuous production assembly. Optionally, the aligning pins 47 and 49 may be replaced with mounting members, or legs or other stabilizing means so that the apparatus constitutes a free-standing structure.

Various modifications and changes may be made to the illustrated embodiment described above without departing from the principles of the present invention. For example, FIGS. 10 through 12 illustrate a monitoring apparatus 220 comprising a single trace station comprising trace paddle 292 connected to rotatable shaft 290. End of trace paddle 292 comprises a freely rotating roller 293 for facilitating movement of the paddle 292 over a conveyed package. A first set of compression rollers 295 is placed forward (or upstream) of the trace paddle 292, and a second set of compression rollers 297 is placed rearward (or downstream) of the trace paddle 292. The compression rollers 295 and 297 maintain tension on the package to thereby supply the trace paddle 292 a consistent trace surface. The compression rollers 295, 297 also force air out of packages having open holes, i.e., improperly sealed packages, thereby changing the volume of the package and the trace results. Another modification shown in FIGS. 10 through 12 is the use of separate drive motors to drive the top and bottom belts, respectively. The motors are synchronized, e.g., with a speed controller, to match belt speeds. The drive motors are located in driver housing 359. Still another modification shown in FIGS. 10 through 12 is the location of round belt 348 to contact a midpoint of packages passing through apparatus 220. Other components of the apparatus 220 are identical or substantially identical to those described above and, therefore, their descriptions are not repeated here in the interest of brevity.

A preferred program and method for operating the inspecting apparatus 20 will now be described. The described program and method are exemplary. The apparatus 20 of the invention is not necessarily limited to operation in the manner described below. Conversely, the described program and method are not necessarily limited to operation with the illustrated apparatus 20. Further, the apparatus and methods of the invention can be applied to various packages, flexible and/or rigid. Products that may be stored in the packages include, for example and not necessarily limitation, food products such as snack foods, meat, fish and poultry, as well as other perishable and non-perishable items. Aspects of the invention may be practiced with modified atmosphere packaging, which typically comprises a relatively rigid tray with items and a flexible seal on top. Modified atmosphere packaging is practiced, for example, in the packaging of meats.

A sealed package (not shown) is placed on the flat conveyor belt 152. As the package is advanced forward along direction F (FIG. 2), preferably at constant speed, with one of the package dimensions (e.g., length) moving parallel to the direction of travel. The package is subjected to compression between the lower flat conveyor belt 152 and the upper round belt 148. The lower flat conveyor belt 152 and the upper round belt 148 are illustrated powered by the same motor, and optionally are mechanically linked together. Alternatively, separate motors operated belts 152 and 148. Preferably, the belts 152 and 148 are operated at identical speeds. The pivotal connection of the linkages 134 to the mounting bar 120 permits the linkages 134 and hence the upper round belt 148 to conform to the package thickness. Simultaneously, the downward urging force that the compression springs 140 impart to the linkages 134 maintains the package under constant compressive force while powering the package through the apparatus 20. Preferably, the downward tension is not sufficiently great to damage the package seal or the contents of the package. If a much larger or smaller package is run through the apparatus 20, the spacing between the belts 148 and 152 may require adjusting. In the illustrated embodiment, the apparatus 20 may be quickly adjusted without tools by loosening the handle clamps 118 and 119, then sliding the round belt conveyor subassembly 110 up or down. Because the upper guide pulleys 122, 124, 126, and the lower guide pulleys 144 move in unison with the round belt conveyor subassembly 110, the belt 148 may be kept under tension as the subassembly 110 is moved. The handle clamps 118 and 119 may then be tightened.

The flat conveyor belt 152 preferably has a width at least as wide, and optionally wider than width of the package so that the package is fully supported by the flat conveyor belt 152. On the other hand, the round belt 148 preferably possesses a smaller width than the flat conveyor belt 152 and the package. The round belt 148 preferably is between the side edges of the package and optionally is offset from the center of the package, thereby dividing the package into two unequal sections. A majority of the package contents, including air in the package, is displaced to a first side of the round belt associated with the larger of the two unequal sections, and a minority of the package contents is displaced to a second side of the round belt associated with the smaller of the two unequal sections. The package and package contents (including air) contour around the belt, providing the upper surface of the package with a shape substantially resembling a lower case "m" when viewed from the front or rear end of the package. Because the round belt 148 runs off center of the package, as described above, one side (or hump) of the "m" is larger than the other. It should be understood that in an optional variation to this embodiment the apparatus may be modified to apply the round belt 148 down the center of the package for dividing the package into two equal sections. In the interest of brevity, the description below is directed to the embodiment comprising the "offset" round belt 148.

Figure 9:
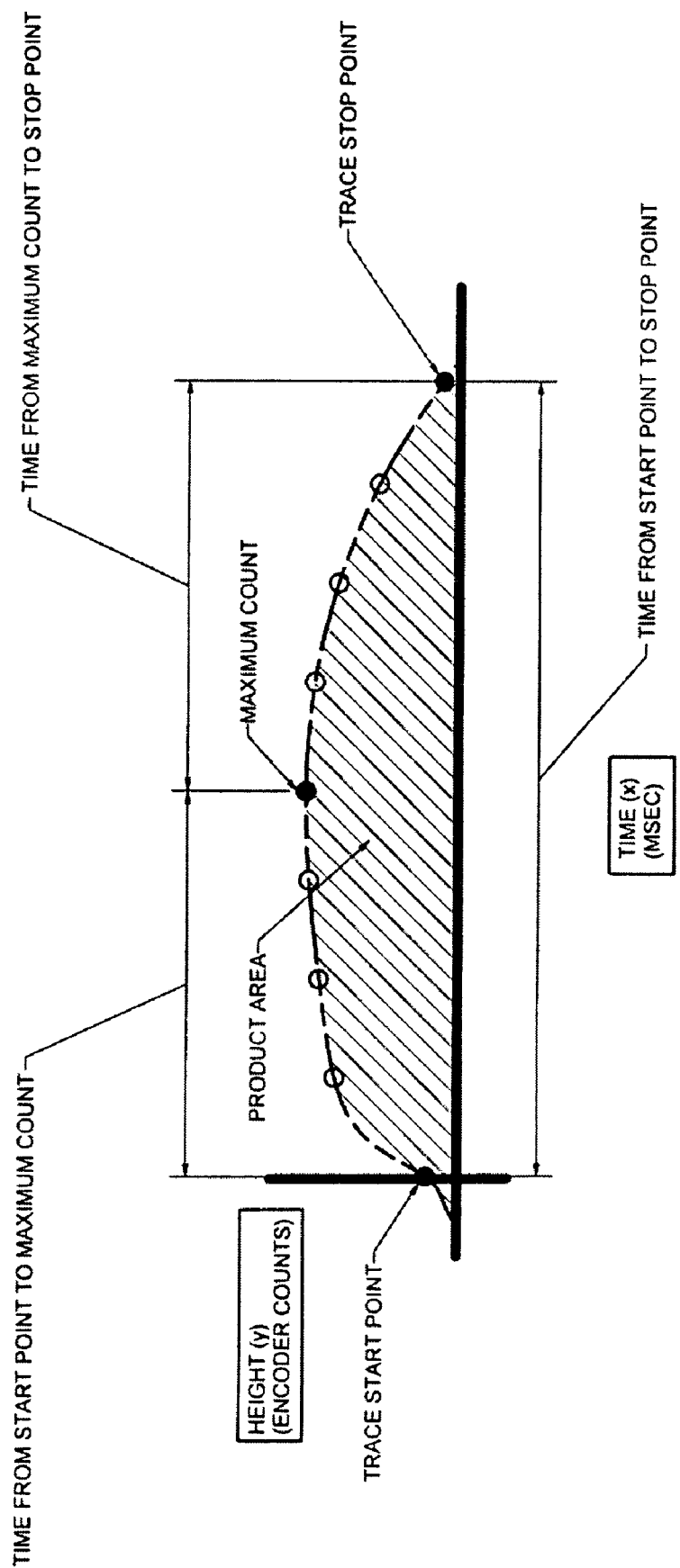
FIG. 9 is an example of a product trace plot taken by one of the trace stations of the apparatus of FIG. 1.

Constant pressure is maintained on the package as the package is transported to the first trace station. As the package passes under the first rotatable shaft 90, a distal end of the first tracer 92 is moved over the passing package, preferably the larger side of the package. The first trace paddle 92 may be weighted using an adjustable counterweighed to achieve the desired pressure on the package. The distal end of the first tracer 92 follows the contour of the upper surface of the larger package side as the distal end moves over the package upper surface to create a "trace" of the larger side of the package upper surface. An example of such a trace is shown in FIG. 9. The first tracer 92 first makes contact with the larger side of the package upper surface proximate to the "trace start point" and is lifted to a 'preset start value.' TRACE STATION 1 begins to record and store the package data. From there, the first tracer 92 continues to follow the contour of the larger side of the package upper surface as the package is advanced through the first trace station. As the distal end of the first tracer 92 moves up and down with the contour of the package upper surface, the first rotatable shaft 90 coupled to the first tracer 92 undergoes small rotational movements, which are measured and converted to electrical signals by the high-resolution first encoder 98. The first encoder 98 takes a plurality (e.g., a few to several hundred) sample data points throughout the trace based on the rotational movement of the shaft 90. The sample data points may be measured and recorded as a function of time. The sample data points are preferably taken at a fixed interval, such as on the order of about a millisecond. When the package exits TRACE STATION 1 and the trace paddle lowers to a 'preset stop value' the data collection is complete. The encoder information is recorded and stored as DATA SET 1 representing one or more package attributes, as explained in further detail below. The encoder information represented in DATA SET 1 is available for calculation, analysis, and comparison.

The belts 148 and 150 advance the package through the apparatus 20 and into contact with the compression station comprising compression rollers 146. As the package is advanced through the compression station, the compression rollers 146 pass over the larger first side of the upper package surface to apply a compressing force. The compression rollers 146 may be used to apply an integrity test on the package seal and to force air out of the package through open holes, if any. Accordingly, if the package is not properly sealed, the compression rollers 146 will change the package attributes, e.g., volume. On the other hand, if the package is properly sealed, the compression rollers 146 should not have a significant effect on the package attributes.

As mentioned above, the compression rollers 146 are coaxial with and attached to respective lower guide pulleys 144 that guide the round belt 148. The compression rollers 146 are thereby driven at a corresponding speed and direction as the package, making for a smooth transition.

After leaving the compression station, the package enters the second tracer station. The second rotatable shaft 100, the second tracer paddle 102, and the second encoder 104 operate in substantially the same manner described above with regard to the first rotatable shaft 90, the first tracer paddle 92, and the first encoder 98, respectively. As the package passes through the second tracer station, DATA SET 2 is generated in much the same manner described above for DATA SET 1.

The tracers 92/102 and associated encoders 98/104 may measure one or more package attributes, including but not necessarily limited to at least one or any combination of the following:

1. MAXIMUM COUNT (see FIG. 9), which is the maximum value (e.g., mm) the encoder reaches as the product is traced;
2. TRACE AREA, which is the sum of encoder counts for every logic scan starting when the start count is reached and ending when the stop count is reached;
3. PACKAGE VOLUME (e.g., liters), calculated by multiplying the TRACE AREA by the product width (preset number not necessarily measured by tracers);
4. START TO MAX TIME (e.g., msec), which is the time elapsing from the trace start point (FIG. 9) to the MAXIMUM COUNT;
5. MAX TO STOP TIME (e.g., msec), which is the time elapsing from the MAXIMUM COUNT to the trace stop point (FIG. 9);
6. START TO STOP TIME (e.g., msec), which is the time elapsing from the trace start point to the trace stop point;
7. BUMP COUNT, which is the number of times the encoder count goes up and down by more than a preset bump window; and/or
8. INDIVIDUAL POINT COUNTS, see the sample data points in FIG. 9.

For example, a high BUMP COUNT is usually representative of a broken seal or an insufficient protective "air cushion" inside the package. When tracing a properly sealed package, the trace paddles normally follow a relatively smooth contour/profile (see FIG. 9, for example) due to the distribution of the "air cushion" inside the package. That is, the trace paddles ride over the sealed air cushion of the package, and do not come into significant contact with the package solid contents, which are protected by the air cushion in a properly sealed package. However, if the package seal is broken or if the package does not possess a sufficient air cushion, the trace paddles will contact and trace the contour of the solid package contents, and in doing so will repeatedly move up and down in a bump-like motion.

After the package exits the second tracer station, one or more of the package attributes of the first and second trace stations (i.e., DATA SET 1 and DATA SET 2) are analyzed and, based on the analysis, the package is accepted or rejected. If the DATA SETs differ greater than a 'first preset tolerance' then the package is considered defective (e.g., a "leaker") and the package is sorted and discarded (or subject to resealing operation) accordingly. Defective packages may be ejected using, for example, air nozzles for displacing the defective package into a rejection bin.

An example of a method for analyzing the collected data follows. According to this example, the MAXIMUM COUNT tolerance test fails if the difference between DATA SET 1 and DATA SET 2 MAXIMUM COUNTS is greater than a maximum count tolerance value. Likewise, the START TO MAX tolerance test fails if the difference between DATA SET 1 and DATA SET 2 'START TO MAX times' is greater than a corresponding tolerance value. The other package attributes listed above may be subject to similar tolerance testing. Similarly, comparative testing may be made on INDIVIDUAL POINT COUNTS on a point-by-point basis.

If DATA SET 1 and DATA SET 2 pass a predetermined number of the tolerance tests and do not differ greater than the first preset tolerance value(s) then DATA SET 1 and DATA SET 2 are averaged or otherwise combined together to create a DATA SET 3. DATA SET 3 is then compared to a running AVERAGE DATA SET, i.e., a baseline. If DATA SET 3 and the AVERAGE DATA SET differ by less than the second preset tolerance, then the package is deemed acceptable and proceeds, for example, to further processing, shipment, etc. DATA SET 3 is also incorporated into the AVERAGE DATA SET, which is recalculated to include and average in DATA SET 3. The recalculated AVERAGE DATA SET is then used as the baseline for comparison against the DATA SET 3 value for the subsequent, upstream package passing through the apparatus. This process of updating the AVERAGE DATA SET may be repeated each time a package is found acceptable.

On the other hand, if DATA SET 3 and the AVERAGE DATA SET differ greater than a 'second preset tolerance' then the package is considered to contain an unacceptable seal or is otherwise "out of spec" and is sorted, e.g., rejected or reprocessed, accordingly. A given DATA SET 3 for a rejected package is preferably not included in the recalculation of the AVERAGE DATA SET.

It should be understood that either DATA SET 1 or DATA SET 2 alone may be compared against the running AVERAGE DATA SET and included in the recalculation of the running average. It should also be understood that in the event that the apparatus includes only a single tracer station, as in the case of the embodiment illustrated in FIGS. 10 through 12, the data set generated by the tracer station may be compared against and included in the recalculation of the AVERAGE DATA SET.

The AVERAGE DATA SET may be a predetermined value, as selected by the operator or programmer. Alternatively, the initial AVERAGE DATA SET may comprise an average of a plurality (e.g., 10) of packages initially passing through the tracer station(s).

After DATA SETs 1, 2, and/or 3 are analyzed the decision is made how to sort the package. A signal is sent to the sorting device using a 'preset delay'. Also, the system may optionally accept an external signal and sort the package accordingly. The external signal can override machine's sort decision. For example, the external signal may be based on the measured weight and/or length of a package, or visual observation of the operator. Standard in-motion scales may be used for taking these measurements.

In a preferred embodiment for carrying out the invention, the program comprises a start filter count for filtering out false 'start trace counts,' for example, when the paddle bounces prior to reaching the package. According to an embodiment, the filter delays the collection of data until the trace paddle is raised to a predetermined minimum value.

The start filter count thereafter permits data collection, and in this manner improves the accuracy of measured attributes, including the TRACE AREA, PACKAGE VOLUME, START TO MAX TIME, and START TO STOP TIME.

According to an embodiment of the invention, the encoder readings from TRACE STATIONs 1 and 2 are fed to a microprocessor (or Programmable Logic Controller) via a small change in DC voltage (analog signal). The microprocessor (or PLC or motion controller or servo drive) uses its program to convert the readings to a form it can analyze. An example of such a program is the Yaskawa MotionWorks Version 4.07. All or some of the previous mentioned tests are performed on DATA SETs 1, 2, and 3 inside the microprocessor (or PLC). When the data is analyzed, the microprocessor (or PLC) triggers an output signal to reject or accept the package.

The preset values used in the program may be set from a human-machine interface (HMI) or touch panel. The interface allows the operator to change the value/parameters as required or desired. An example of a method of inspecting with preset values entered through the HMI is set forth below:

1. Start trace count (mm): As the package lifts the trace paddle, when this encoder count is reached events are triggered.
2. Start filter count (mm): Used for filtering out a false "start trace count" when the paddle bounces.
3. Stop trace count (mm): As the package lowers the trace paddle, when this encoder count is reached events are triggered.
4. Maximum count tolerance (mm): The "maximum count" test fails if the difference between DATA SET 1 and DATA SET 2 "maximum count" is greater than this value.
5. Start to Max tolerance (msec): This test fails if the difference between DATA SET 1 and DATA SET 2 "start to max time" is greater than this value.
6. Max to stop tolerance (msec): The "max to stop" test fails if the difference between DATA SET 1 and DATA SET 2 "max to stop time" is greater than this value.
7. Start to stop tolerance (msec): The "start to stop" test fails if the difference between DATA SET 1 and DATA SET 2 "start to stop time" is greater than this value.
8. Bump count tolerance (count): The "bump" test fails if the difference between DATA SET 1 and DATA SET 2 "bump count" is greater than this value.
9. Bump Count Window (mm): The encoder count must go up and down at least this value for the change to be counted as a bump.
10. Package width (mm): actual width of the package.
11. Target volume (liters): the desired volume of the package.

Optionally, the inspecting method can include the additional step 7A (between steps 7 and 8) as follows:

7A. Package area tolerance: One data set is compared to the running average. If it is outside of the tolerance the package is rejected.

In summary, the mechanical apparatus serves to present the package to the one or more trace stations under constant pressure to perform an accurate trace while forcing out air through any open holes. The electrical components of the apparatus, e.g., the encoders, collect one or more data sets from the trace station(s). The processor and software calculate and analyze the data. For example, the area of the package may be calculated by reading the height of the package with respect to time. Referring to FIG. 9, the package may be broken up into segments, with a height measurement taken at each segment. The area of each segment is then determined based on the measured height and set distance. Package segments are continually measured until the measured height equals zero, meaning the package has passed the tracer station. The segments areas are then added together to provide a sum equal to the total area of the package. Based on this information, an accept- or reject decision may be made, in addition to providing feedback information.

The components (e.g., mechanical, electrical, processing) of the described may be practiced alone, in combination with each other, or in combination with other or equivalent components.

Exemplary programs for performing aspects of the present invention are attached hereto as Appendix 1 and Appendix 2 and constitute part of the specification of this application. The programs are written in Sequential Ladder Logic (although other programming languages such as C or VB may be selected), and may be used in conjunction with the program MotionWorks Version 4.07 of Yaskawa. The programs may be run on a Yaskawa MP920CPU01 PLC equipped with a Yaskawa MP 920 Pulse-In Module counter card or equivalent.

The foregoing detailed description of the certain preferred embodiments of the invention has been provided for the purpose of explaining the principles of the invention and its practical application, thereby enabling others skilled in the art to understand the invention for various embodiments and with various modifications as are suited to the particular use contemplated. This description is not intended to be exhaustive or to limit the invention to the precise embodiments disclosed. Modifications and equivalents will be apparent to practitioners skilled in this art.

What is claimed is:

1. A package inspection apparatus, comprising:
    a conveyor for transporting a package along a direction of travel, the package having an upper surface;
    a presser unit for applying a compressive force to the package traveling on the conveyor;
    a tracer movable over the upper surface of the package traveling on the conveyor for measuring package height at multiple points along a package dimension moving parallel to the direction of travel; and
    a processor for determining a trace area of the package from the package height measurements at the multiple points, and for determining the presence of a leak in the package based on the trace area.
2. The package inspection apparatus of claim 1, wherein:
    the conveyor is a first conveyor having a first width;
    the inspection apparatus comprises a second conveyor spaced apart from the first conveyor and having a second width that is less than the first width and less than a width of the package;
    the second conveyor applies pressure to the upper surface of the package between lateral edges of the package so as to divide the upper surface into two sections; and
    the tracer contacts only one of the two sections of the upper surface.
3. The package inspection apparatus of claim 2, wherein the second conveyor comprises a plurality of pivoting pulleys and a continuous guide belt carried by the pivoting pulleys.
4. The package inspection apparatus of claim 1, wherein:
    the tracer comprises a first tracer and the package height measurements comprise first package height measurements;
    the package inspection apparatus further comprises a second tracer in-line with the first tracer, the second tracer movable over the upper surface of the package traveling on the conveyor for taking a plurality of second package height measurements of the package at multiple points along the package dimension moving parallel to the direction of travel;

the presser unit is interposed between the first and second tracers; and the processor compares the first package height measurements to the second package height measurements.

5. A package inspection apparatus, comprising:

a conveyor for transporting a plurality of packages along a direction of travel;

a presser unit for applying a compressive force to the packages traveling on the conveyor;

a tracer movable over upper surfaces of the packages traveling on the conveyor for measuring a package attribute of each one of the packages at multiple points along a package dimension moving parallel to the direction of travel; and a processor for comparing the package attribute measurements of each individual one of the packages to a running average and, if the package attribute measurements for the individual one of the packages and the running average are within an acceptable tolerance, updating the running average to average in the package attribute measurements of said individual one of the packages.

6. The package inspection apparatus of claim 5, wherein:

the conveyor is a first conveyor having a first width;

the inspection apparatus comprises a second conveyor spaced apart from the first conveyor and having a second width that is less than the first width and less than width of the packages;

the second conveyor applies pressure to the upper surfaces of the packages between lateral edges of the packages so as to divide the upper surfaces into two sections; and the tracer contacts only one of the two sections of the upper surfaces.

7. The package inspection apparatus of claim 6, wherein the second conveyor comprises a plurality of pivoting pulleys and a continuous guide belt carried by the pivoting pulleys.

8. The package inspection apparatus of claim 5, wherein:

the tracer comprises a first tracer and the package height measurements comprise first package height measurements;

the package inspection apparatus further comprises a second tracer in-line with the first tracer, the second tracer movable over the upper surfaces of the packages traveling on the conveyor for taking a plurality of second package height measurements of the packages at multiple points along the package dimension moving parallel to the direction of travel;

the presser unit is interposed between the first and second tracers; and the processor compares the first package height measurements to the second package height measurements.

9. The package inspection apparatus of claim 5, wherein the package attribute comprises trace area.

10. The package inspection apparatus of claim 5, wherein the package attribute comprises a member selected from start-to-max time and max-to-stop time.

11. The package inspection apparatus of claim 5, wherein the package attribute comprises a bump count.

12. A method for inspecting a seal of a package, comprising:

transporting a package on a conveyor along a direction of travel, the package having an upper surface;

applying a compressive force to the package as the package is transported on the conveyor;

moving a tracer over the upper surface of the package traveling on the conveyor for measuring package height at multiple points along a package dimension moving parallel to the direction of travel;

determining a trace area of the package from the package height measurements at the multiple points; and determining the presence of a leak in the package based on the trace area.

13. The method of claim 12, wherein:

the conveyor is a first conveyor having a first width; and the method further comprises positioning a second conveyor in spaced apart relation with the first conveyor, the second conveyor having a second width that is less than the first width and less than width of the package;

passing the package between the first conveyor and a second conveyor to apply a compressive force to the upper surface of the package between lateral edges of the package so as to divide the upper surface into two sections; and contacting the tracer with only one of the two sections of the upper surface.

14. The method of claim 12, wherein:

the tracer comprises a first tracer and the package height measurements comprise first package height measurements;

the method further comprises moving a second tracer in-line with the first tracer over the upper surface of the package traveling on the conveyor for taking a plurality of second package height measurements of the package at multiple points along the package dimension moving parallel to the direction of travel;

subjecting the package to a pressing operation between the first and second tracers; and comparing the first package height measurements to the second package height measurements.

15. The method of claim 12, wherein the package comprises modified atmosphere packaging.

16. A method for inspecting package seals, comprising:

transporting a plurality of packages on a conveyor along a direction of travel;

applying a compressive force to the packages traveling on the conveyor;

moving a tracer over upper surfaces of the packages traveling on the conveyor and measuring a package attribute of each one of the packages at multiple points along a package dimension moving parallel to the direction of travel;

establishing a value for a running average; and comparing the package attribute measurements of each individual one of the packages to the running average and, if the package attribute measurements for the individual one of the packages and the running average are within an acceptable tolerance, updating the running average to average in the package attribute measurements of the individual one of the packages.

17. The method of claim 16, wherein:

the conveyor is a first conveyor having a first width; and the method further comprises positioning a second conveyor in spaced apart relation with the first conveyor, the second conveyor having a second width that is less than the first width and less than width of the package;

passing the packages between the first conveyor and a second conveyor to apply a compressive force to the upper surfaces of the packages between lateral edges of the packages so as to divide the upper surfaces into two sections; and contacting the tracer with only one of the two sections of the upper surfaces.

18. The method of claim 16, wherein:

the tracer comprises a first tracer and the package height measurements comprise first package height measurements;

the method further comprises moving a second tracer in-line with the first tracer over the upper surfaces of the packages traveling on the conveyor for taking a plurality of second package height measurements of the packages at multiple points along the package dimension moving parallel to the direction of travel;

subjecting the packages to a pressing operation between the first and second tracers; and comparing the first package height measurements to the second package height measurements.

19. The method of claim 16, wherein the package attribute comprises trace area.

20. The method of claim 16, wherein the package attribute comprises a member selected from start-to-max time and max-to-stop time.

21. The method of claim 16, wherein the package attribute comprises a bump count.

22. The method of claim 16, wherein the package comprises modified atmosphere packaging.

* * * * *